US009352906B2

(12) United States Patent
Suefuji

(10) Patent No.: US 9,352,906 B2
(45) Date of Patent: May 31, 2016

(54) RUBBER-REINFORCING STEEL CORD AND CONVEYOR BELT

(71) Applicant: The Yokohama Rubber Co., LTD., Minato-ku, Tokyo (JP)

(72) Inventor: Ryotaro Suefuji, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/427,614

(22) PCT Filed: Sep. 6, 2013

(86) PCT No.: PCT/JP2013/074104
§ 371 (c)(1),
(2) Date: Mar. 11, 2015

(87) PCT Pub. No.: WO2014/042097
PCT Pub. Date: Mar. 20, 2014

(65) Prior Publication Data
US 2015/0246775 A1 Sep. 3, 2015

(30) Foreign Application Priority Data
Sep. 11, 2012 (JP) .................................. 2012-199703

(51) Int. Cl.
*B65G 15/36* (2006.01)
*B65G 15/34* (2006.01)
*D07B 1/06* (2006.01)

(52) U.S. Cl.
CPC ................ *B65G 15/36* (2013.01); *B65G 15/34* (2013.01); *D07B 1/062* (2013.01); *D07B 1/0633* (2013.01); *D07B 1/0666* (2013.01); *D07B 2201/2028* (2013.01); *D07B 2201/2037* (2013.01);

(Continued)

(58) Field of Classification Search
CPC ......... B65G 15/36; B65G 15/34; D07B 1/0666; D07B 1/062
USPC ........................................................... 198/847
See application file for complete search history.

(56) References Cited

U.S. PATENT DOCUMENTS

| | | | | | |
|---|---|---|---|---|---|
| 3,296,062 | A | * | 1/1967 | Truslow | B29D 29/00 139/420 R |
| 5,261,473 | A | * | 11/1993 | Penant | B60C 9/0028 152/451 |
| 2002/0134478 | A1 | * | 9/2002 | Noferi | D07B 1/0633 152/451 |

(Continued)

FOREIGN PATENT DOCUMENTS

| JP | 6010281 A * | 1/1994 | ................ D07B 1/06 |
|---|---|---|---|
| JP | H06-158566 | 6/1994 | |

(Continued)

OTHER PUBLICATIONS

International Search Report for International Application No. PCT/JP2013/074104 dated Dec. 10, 2013, 4 pages, Japan.

*Primary Examiner* — Mark A Deuble
(74) *Attorney, Agent, or Firm* — Thorpe North & Western

(57) ABSTRACT

Provided is a rubber-reinforcing steel cord that has superior productivity and is advantageous in reducing weight and improving bending resistance, as well as a conveyor belt that uses the rubber-reinforcing steel cord. A rubber-reinforcing steel cord 1 having a 1+6+(6+6) structure formed by twisting individual steel wires 2, 3, 4a, and 4b once in the same direction, a twist multiple of at least 9 and not greater than 14, and an outer diameter of not greater than 4 mm is used by being embedded in a rubber product.

8 Claims, 4 Drawing Sheets

(52) U.S. Cl.
CPC . *D07B2201/2059* (2013.01); *D07B 2501/2076* (2013.01)

(56) References Cited

U.S. PATENT DOCUMENTS

| | | | | |
|---|---|---|---|---|
| 2011/0315296 | A1* | 12/2011 | Cogne | B60C 9/0007 152/556 |
| 2012/0000174 | A1 | 1/2012 | Pottier | |
| 2012/0125741 | A1* | 5/2012 | Vanderploeg | B65G 15/34 198/847 |

FOREIGN PATENT DOCUMENTS

| | | | | |
|---|---|---|---|---|
| JP | 2007-031890 | | 2/2007 | |
| JP | 2007-303043 | | 11/2007 | |
| JP | 2012-36539 | | 2/2012 | |
| JP | 2012036927 A | * | 2/2012 | F16L 11/08 |
| JP | 2012-508830 | | 4/2012 | |
| WO | WO 2010/054791 | | 5/2010 | |

\* cited by examiner

RUBBER-REINFORCING STEEL CORD AND CONVEYOR BELT

TECHNICAL FIELD

The present technology relates to a rubber-reinforcing steel cord and a conveyor belt, and more specifically to a rubber-reinforcing steel cord that has superior productivity and is advantageous in reducing weight and improving bending resistance while maintaining cord strength, and a conveyor belt that uses the rubber-reinforcing steel cord.

BACKGROUND

Steel cords formed from twisted steel wires are used as reinforcing material for rubber products such as tires, conveyor belts, and rubber hoses. One example is a stranded steel cord in which a plurality of sheath strands is twisted around the outer circumferential surface of a core strand (see, for example, Japanese Unexamined Patent Application Publication No. 2012-36539A).

A steel cord 12 having a 7×7 structure like that illustrated in FIG. 4 is often used as a core in a conveyor belt. The 7×7 steel cord 12 is formed by six sheath strands 14 twisted around the outer circumference of a single core strand 13. The core strand 13 is formed by six steel wires 13b twisted around a single steel wire 13a. The sheath strands 14 are formed by six steel wires 14b twisted around a single steel wire 14a. Thus, three twining processes are required to manufacture the 7×7 steel cord 12, leading to the problem of very poor productivity if the cord is small in diameter. If the steel cord is used as a core in a conveyor belt, superior cord strength is required, as is reduced weight and improved bending resistance in order to reduce the energy consumption needed to drive the belt.

SUMMARY

The present technology provides a rubber-reinforcing steel cord that has superior productivity and is advantageous in reducing weight and improving bending resistance, as well as a conveyor belt that uses the rubber-reinforcing steel cord.

A rubber-reinforcing steel cord according to the present technology is a rubber-reinforcing steel cord that is used by being embedded in a rubber product, the cord has a 1+6+(6+6) structure formed by twisting individual steel wires once in an identical direction, a twist multiple is at least 9 and not greater than 14, and an outer diameter is not greater than 4 mm.

The outer diameters of the individual steel wires are, for example, at least 0.35 mm and not greater than 0.75 mm. Of the two types of steel wire constituting the outer layer, the outer diameter of the small-diameter steel wires can be at least 60% and not greater than 90% of the outer diameter of the large-diameter steel wires.

Also, a conveyor belt according to the present technology is a conveyor belt in which the rubber-reinforcing steel cord described above is embedded therein as a core.

In accordance with the rubber-reinforcing steel cord according to the present technology (hereinafter, referred to as the steel cord), the cord has a 1+6+(6+6) structure formed by twisting individual steel wires once in an identical direction, allowing the cord to be completed in a single twisting process and improving productivity. The cord has a twist multiple of at least 9 and not greater than 14 and an outer diameter of 4 mm or less, which are advantageous in reducing weight and improving bending resistance while ensuring the necessary cord strength.

It is therefore possible to reduce the energy consumption necessary to drive a conveyor belt having this steel cord embedded therein as a core.

BRIEF DESCRIPTION OF THE DRAWING(S)

DETAILED DESCRIPTION

Figure 1:
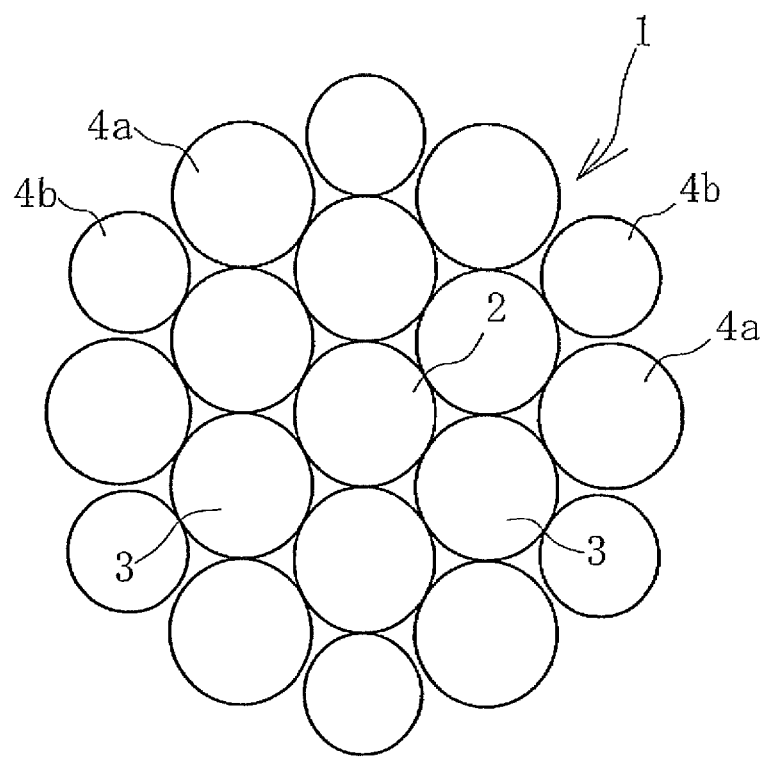
FIG. 1 is a side cross-sectional view illustrating a steel cord according to the present technology.

The steel cord and conveyor belt according to the present technology will now be described with reference to the embodiments illustrated in the drawings.

The steel cord 1 according to the present technology illustrated in FIG. 1 is a rubber-reinforcing steel cord that is used by being embedded in a rubber product. The steel cord 1 has a 1+6+(6+6) structure, and is formed from a single steel wire 2 serving as a core wire, six steel wires 3 forming an inner layer disposed around the outer circumferential surface of the steel wire 2, and twelve steel wires 4a, 4b forming an outer layer disposed around the outer circumferential surfaces of the steel wires 3. The outer layer is made up of six large-diameter steel wires 4a and six small-diameter steel wires 4b. The individual steel wires 2, 3, 4a, and 4b are twisted once in an identical direction, and adjacent steel wires are disposed in contact at maximum density. Both the S direction and the Z direction may be adopted as the twist direction.

The twist multiple K of the cord is at least 9 and not greater than 14, and the outer diameter D of the cord is 4 mm or less. The twist multiple K is the twist length L relative to the cord outer diameter D (K=L/D). An outer diameter D for the cord exceeding 4 mm is disadvantageous for reducing weight and improving bending resistance; thus, the diameter D is 4 mm or less. In order to ensure a practical level of cord strength, the outer diameter D of the cord is preferably, for example, 2 mm or more. A twist multiple K of less than 9 will lead to a marked reduction in cord strength, and a twist multiple K exceeding 14 will lead to a marked reduction in bending resistance; thus, the twist multiple K is at least 9 and not greater than 14.

The outer diameter of the individual steel wires 2, 3, 4a, and 4b is, for example, at least 0.35 mm and not greater than 0.75 mm. Out of considerations such as cost reduction, the steel wire 2 forming the core wire and the large-diameter steel wires 4a forming the outer layer should have the same outer diameter. Balance will be improved if, of the two types of steel wires 4a, 4b forming the outer layer, the outer diameter of the small-diameter steel wires 4b is, for example, at least 60% and not greater than 90% of the outer diameter of the large-diameter steel wires 4a.

Figure 3:
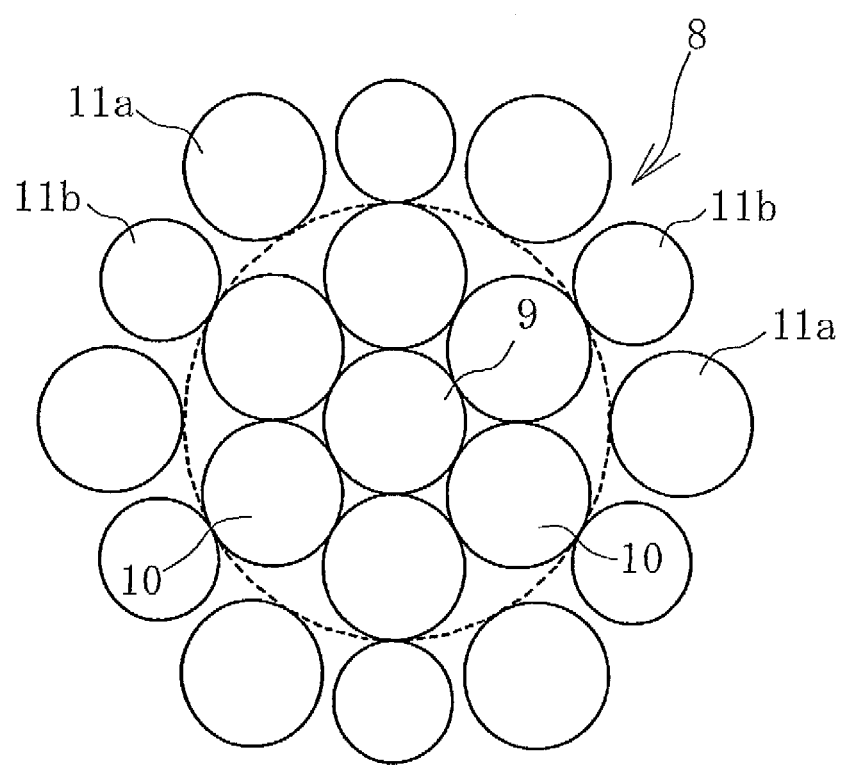
FIG. 3 is a side cross-sectional view illustrating a 1+6+(6+6) steel cord in which steel wires are twisted in different directions in an inner layer and an outer layer.

The steel cord 8 illustrated in FIG. 3 is formed from a single steel wire 9 serving as a core wire, six steel wires 10 forming an inner layer disposed around the outer circumferential surface of the steel wire 9, and twelve steel wires 11a, 11b forming an outer layer disposed around the outer circumferential surfaces of the steel wires 10. The outer layer is made up of six large-diameter steel wires 11a and six small-diameter steel wires 11b. The individual steel wires 10 are twisted in a certain direction around the outer circumferential surface of the steel wire 9 constituting the core wire. The individual steel wires 11a, 11b are twisted in a direction opposite that of the steel wires 10 forming the inner layer around the outer circumferential surface of the steel wires 10.

The steel cord 8 therefore has a 1+6+(6+6) structure, and the inner layer and the outer layer have different twisting directions, therefore, requiring two twisting processes to manufacture the steel cord 8. Because the inner layer and the outer layer have different twisting directions, the steel wires 10 of the inner layer and the steel wires 11a, 11b of the outer layer are not disposed at maximum density, but have a certain degree of space therebetween.

Specifically, although the steel cord 1 according to the present technology illustrated in FIG. 1 has a 1+6+(6+6) structure, the individual steel wires 2, 3, 4a, and 4b are twisted once in the same direction, allowing for a minimal single twisting process and improved productivity. Because the inner layer and the outer layer are twisted in the same direction, the steel wires 3 and the steel wires 4a, 4b are nearly in surface contact (increasing contact area), which is advantageous for improving bending resistance.

Figure 2:
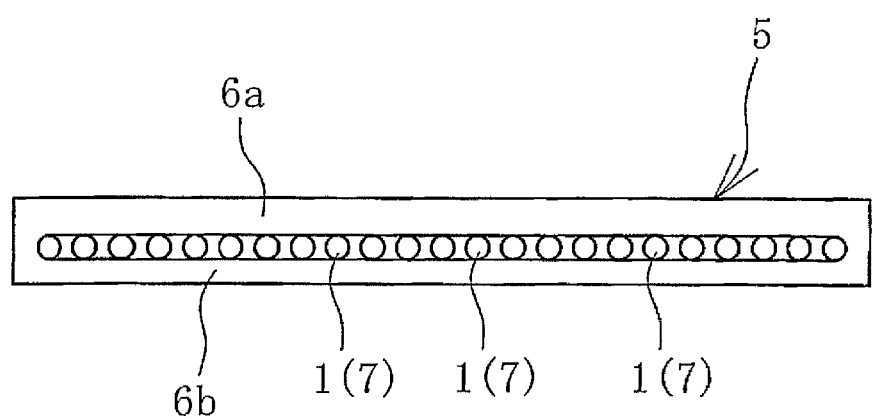
FIG. 2 is a side cross-sectional view illustrating a conveyor belt having the steel cord depicted in FIG. 1 embedded therein as a core.

The steel cord 1 according to the present technology can be used by being embedded as reinforcing material in various types of rubber products such as tires, rubber hoses, marine hoses, and boat/ship fenders. As illustrated in FIG. 2, the steel cord 1 is especially preferably used as a core 7 of a conveyor belt 5.

In the conveyor belt 5, a large number of steel cords 1 are disposed at predetermined intervals in the belt width direction and extend in the belt length direction, and are embedded between an upper rubber cover 6a and a lower rubber cover 6b.

The cores 7, which bear tension when the conveyor belt 5 is stretched, require superior bending resistance; thus, the steel cord 1 according to the present technology is extremely advantageous for use as the same. Using steel cords 1 of reduced diameter allows the thickness of the conveyor belt 5 to be reduced, which contributes in reducing the weight of the conveyor belt 5. These effects make it possible to reduce the energy consumption necessary to drive the belt.

EXAMPLES

Figure 4:
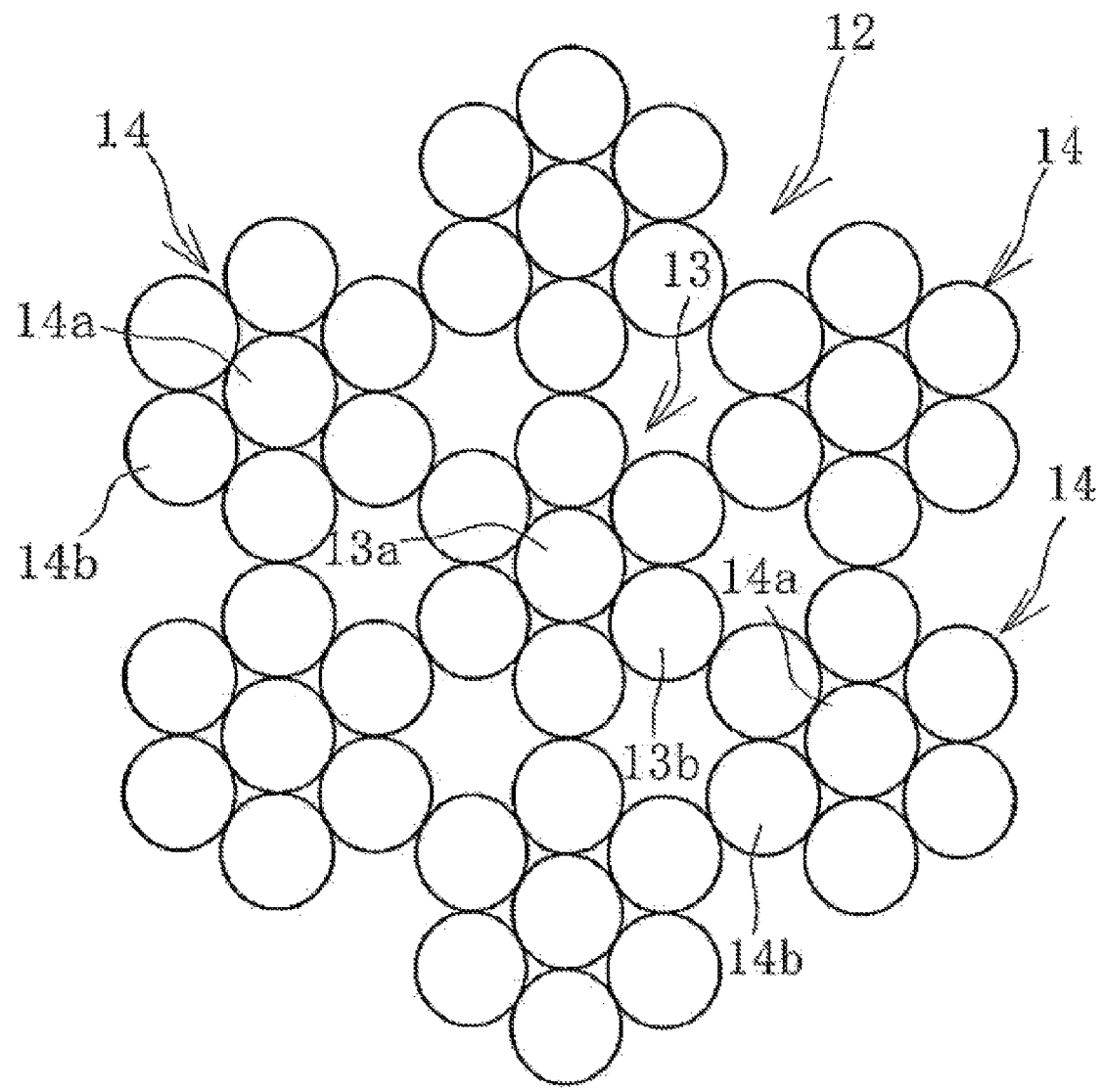
FIG. 4 is a side cross-sectional view illustrating a 7×7 steel cord.

As shown in Table 1, steel cords having the structure illustrated in FIG. 1 and different cord twist multiples K and cord outer diameters D (Working Examples 1 to 3, and Comparative Examples 1 to 3), a steel cord having the structure illustrated in FIG. 3 (Comparative Example 4), and a steel cord having the 7×7 structure illustrated in FIG. 4 (Conventional Example) were embedded in unvulcanized rubber (NR/SBR) and vulcanized under identical conditions (148° C.×25 minutes) to manufacture test samples, which were measured for the following properties. Results are shown in Table 1.

The outer diameters of the steel wires in Working Examples 1 to 3 and Comparative Examples 1 to 4 were as follows.
Steel wires labeled 2, 4a in FIGS. 1 and 9, 11 in FIG. 3: 0.59 mm
Steel wires labeled 3 in FIGS. 1 and 10 in FIG. 3: 0.55 mm
Steel wires labeled 4b in FIG. 1 and 11b in FIG. 3: 0.45 mm The outer diameters of the steel wires in the Conventional Example were as follows.
Steel wire labeled 13a in FIG. 4: 0.41 mm
Steel wires labeled 13b, 14a in FIG. 4: 0.35 mm
Steel wire labeled 14b in FIG. 4: 0.31 mm

[Cord Productivity]
The amount of time needed to manufacture the individual steel cords was measured and rated against an index of 100 based on the Conventional Example. The smaller the number is, the greater the productivity is.

[Cord Strength]
The individual steel cords were stretched in the length direction until breaking, and the load at breakage was taken as cord strength.

[Belt Weight]
The weights of the individual test samples were measured and rated against an index of 100 based on the Conventional Example. The greater the number is, the greater the weight is.

[Bending Resistance]
The individual test samples were wrapped around a 90 mm-diameter pulley and repeatedly bent, and the number of times until the cord broke was measured. This number was rated against an index of 100 based on the Conventional Example, with a larger number indicating superior bending resistance.

[Rubber Adhesion]
The individual test samples were left at initial bonding and moist heat conditions (50° C., humidity 95%, 5 weeks), after which the proportion of residual rubber bonded to the surfaces of the cords was measured. The larger the number is, the more superior the strength of the adhesion between the cord and the rubber was.

TABLE 1

|  | Conventional Example | Working Examples | | | Comparative Examples | | | |
|---|---|---|---|---|---|---|---|---|
|  |  | 1 | 2 | 3 | 1 | 2 | 3 | 4 |
| Cord structure | 7 × 7 | 1 + 6 + (6 + 6) | | | | | | |
| No. of twists | 3 | 1 | | | | | | 2 |
| Twist direction | S/Z | Z/Z | | | | | | S/Z |
| K: cord twist multiple | 7.5 | 9.6 | 11.4 | 13.3 | 7.9 | 14.8 | 11.4 | 11.4 |
| D: cord outer diameter (mm) | 2.9 | 2.6 | | | | | 4.4 | 2.8 |
| Cord productivity | 100 | 50 | | | | | | 80 |
| Cord strength (kN) | 9.3 | 9.3 | 9.5 | 9.7 | 8.2 | 9.8 | 27.0 | 9.3 |
| Belt weight (index) | 100 | 98 | | | | | | 99 |
| Bending resistance (index) | 100 | 105 | 102 | 100 | 108 | 82 | 26 | 101 |
| Initial rubber adhesion (%) |  | 95 | | | | | | |
| After being left standing in moist heat Rubber adhesion (%) | 30 | 100 | | | | | | |

It is apparent from Table 1 that Working Examples 1 to 3 were more advantageous than the Conventional Example and Comparative Example 4 in terms of cord productivity and belt weight reduction. It is also apparent that Working Examples 1 to 3 are capable of ensuring bending resistance and cord strength comparable to or greater than those of the Conventional Example.

What is claimed is:

1. A rubber-reinforcing steel cord that is used by being embedded in a rubber product, having a 1+6+(6+6) structure formed by twisting individual steel wires once in an identical direction, a twist multiple being at least 9 and not greater than 14, and an outer diameter being not greater than 4 mm, the 1+6+(6+6) structure having a single steel wire as a core wire, six steel wires forming an inner layer disposed around an outer circumference of the single steel wire and twelve steel wires forming an outer layer disposed around an outer circumference of the six steel wires, the outer layer comprising two types of steel wire.

2. The rubber-reinforcing steel cord according to claim 1, wherein the individual steel wires have outer diameters of at least 0.35 mm and not greater than 0.75 mm.

3. The rubber-reinforcing steel cord according to claim 2, wherein, of two types of steel wire constituting an outer layer, small-diameter steel wires have outer diameters that are at least 60% and not greater than 90% of those of large-diameter steel wires.

4. A conveyor belt in which the rubber-reinforcing steel cord described in claim 3 is embedded as a core.

5. A conveyor belt in which the rubber-reinforcing steel cord described in claim 2 is embedded as a core.

6. A conveyor belt in which the rubber-reinforcing steel cord described in claim 1 is embedded as a core.

7. The rubber-reinforcing steel cord according to claim 1, wherein, of the two types of steel wire constituting the outer layer, small-diameter steel wires have outer diameters that are at least 60% and not greater than 90% of those of large-diameter steel wires.

8. A conveyor belt, comprising:
an upper rubber cover;
a lower rubber cover; and
a plurality of steel cords embedded between the upper rubber cover and the lower rubber cover, each of the plurality of steel cords having a 1+6+(6+6) structure formed by twisting individual steel wires once in an identical direction, a twist multiple being at least 9 and not greater than 14, and an outer diameter being not greater than 4 mm, the 1+6+(6+6) structure having a single steel wire as a core wire, six steel wires forming an inner layer disposed around an outer circumference of the single steel wire and twelve steel wires forming an outer layer disposed around an outer circumference of the six steel wires;
wherein the plurality of steel cords are disposed at predetermined intervals in a width direction of the conveyor belt and extend in a length direction of the conveyor belt.

* * * * *